Figure 1:
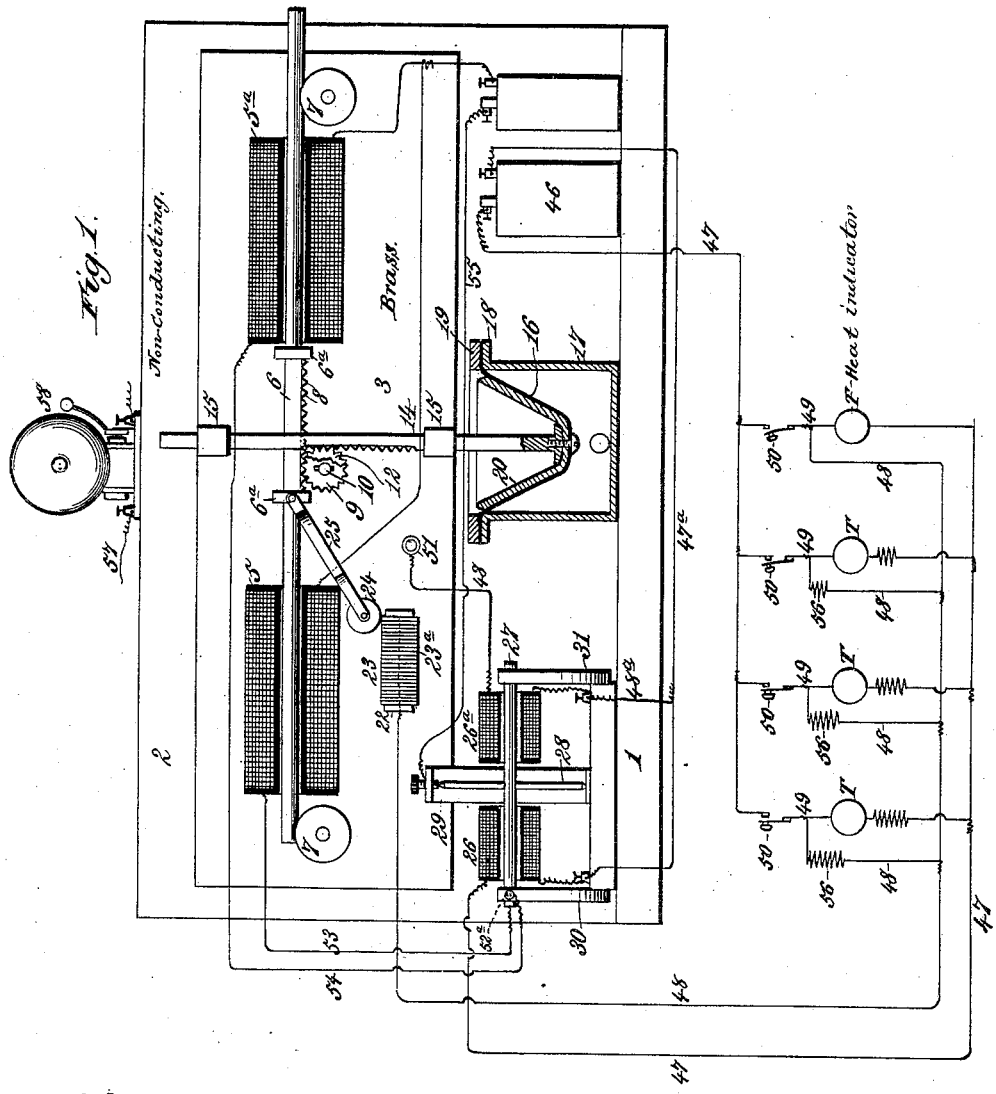

(No Model.) 2 Sheets—Sheet 1.

F. W. WIESEBROCK.
ELECTRIC DISTANCE HEAT INDICATOR AND ALARM.

No. 437,069. Patented Sept. 23, 1890.

Witnesses.
Robert Everett
J. G. Meyers Jr.

Inventor.
Frederick W. Wiesebrock.
By James L. Norris.

(No Model.) 2 Sheets—Sheet 2.

F. W. WIESEBROCK.
ELECTRIC DISTANCE HEAT INDICATOR AND ALARM.

No. 437,069. Patented Sept. 23, 1890.

Witnesses:

Inventor:
Frederick W. Wiesebrock.
By James L. Norris,
Atty.

UNITED STATES PATENT OFFICE.

FREDERICK W. WIESEBROCK, OF NEW YORK, N. Y., ASSIGNOR OF ONE-HALF TO RICHARD M. BRUNO, OF SAME PLACE.

ELECTRIC DISTANCE HEAT-INDICATOR AND ALARM.

SPECIFICATION forming part of Letters Patent No. 437,069, dated September 23, 1890.

Application filed August 31, 1889. Serial No. 322,513. (No model.)

*To all whom it may concern:*

Be it known that I, FREDERICK W. WIESE-BROCK, a citizen of the United States, residing at New York, in the county of New York and State of New York, have invented new and useful Improvements in Electric Distance Heat-Indicators and Alarms, of which the following is a specification.

My present invention relates to that general type or class of apparatus known as "distance electro-thermic indicators and alarms" for indicating at a given station or point the presence of a dangerous temperature at any one or more of a series of points more or less distant from such station or point.

It is the purpose of my invention to provide a novel application of known natural forces, whereby I am able to obtain at any desired moment a correct indication of the actual temperature at that time existing at any one or more of a series of points located at any distance from each other and from a central or main station where the several indications are received.

It is a further purpose of my invention to provide novel means whereby an alarm may be automatically given whenever the temperature at any one or more of a series of points or stations shall rise either to a dangerous height or to any predetermined point to which the apparatus is adjusted.

It is my further purpose to so interpose any number of thermometers or heat-indicators in one branch of an electric circuit and at different points therein that at a given temperature the resistance in both branches shall be the same, to vary the resistance in the indicator branch by the thermic reaction of the individual heat-indicators or thermometers, to control the direction of the current in the other branch of said circuit by the difference in resistance of the two branches and apply the electro-motive force of the current to the equalization of the resistance of the two branches of the circuit, and to the registration of the volume of resistance required to effect the equalization, whence the degree of temperature shown by any one of the heat-indicators is instantly made known.

The said invention consists in the novel apparatus hereinafter set forth and in the several novel features of construction and new combinations of parts, fully described in this specification, and specially pointed out in the claims following the same.

To enable others skilled in the art to practice said invention, I will now describe the same in detail, reference being had to the drawings accompanying this application, in which I have shown an apparatus suitable for practicing the process, and in which—

Figure 2:
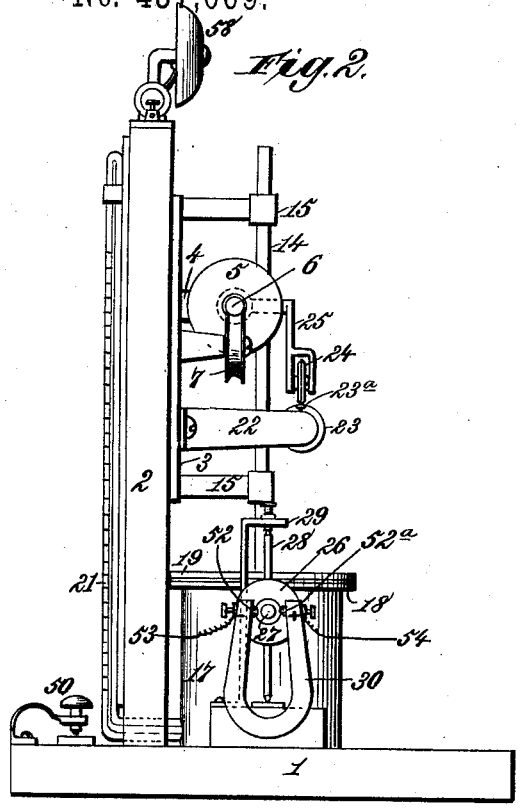
Figure 3:
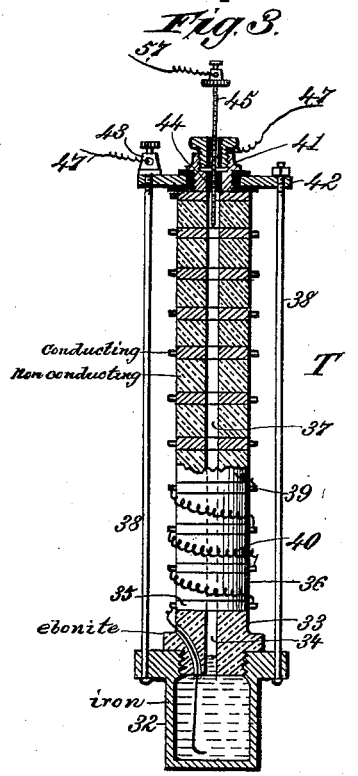
Figure 4:
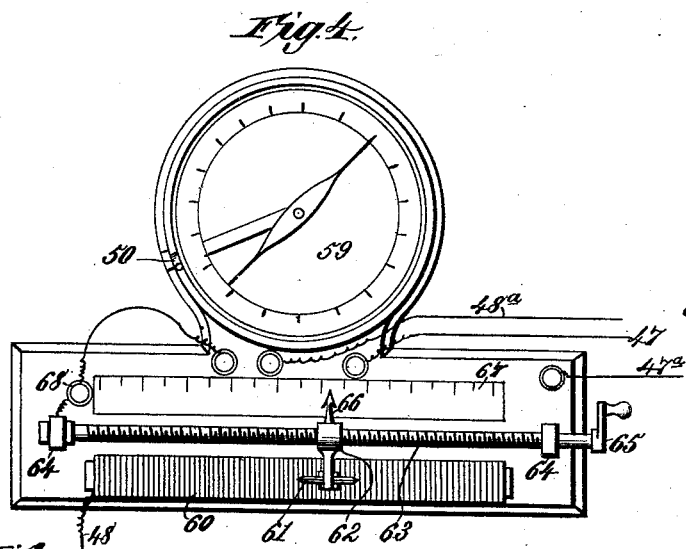
Figure 5:
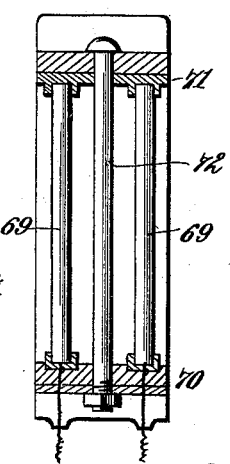

Figure 1 is a front elevation, partly in section, showing one form of apparatus with a diagram of the circuits. Fig. 2 is an end elevation of Fig. 1, taken from the left of said figure. Fig. 3 is a sectional view of one form of heat-indicator or thermometer. Fig. 4 is a plan view of a modified form of apparatus. Fig. 5 is a detail view showing a different form of heat-indicator.

In the said drawings, the reference-numeral 1 denotes any suitable support or base, made of wood or other suitable material, upon which is mounted a vertical plate 2. I prefer to form the base-plate 1 of some insulating material and to make the plate 2 of similar non-conducting material.

Upon the face of the vertical plate 2 is mounted a plate of brass or other metal 3 having electrical conductivity. Projecting from this brass plate are brackets 4, upon which are mounted two solenoids 5 and $5^a$, one being placed near each end of the plate, whereby they are separated by a suitable interval or space. Lying within these solenoids is a continuous bar 6, of soft iron, provided upon each side of its central portion with a collar $6^a$, by which its movements under the attraction of either solenoid is limited. This bar is of such length that it passes entirely through both solenoids and projects beyond the ends of both cores, its projecting ends resting upon grooved wheels 7, by which its weight is supported and upon which it moves longitudinally under the alternating attraction of either core. Upon the bar 6 is formed or mounted a rack 8, which meshes with a pinion 9, the latter being supported upon a shaft 10 projecting from the vertical plate 2. A second pinion 12 upon the same shaft meshes with a rack upon a vertical plunger 14, which is supported in guide-brackets 15 mounted on the plate 3. The lower end of this plunger is connected with a flexible diaphragm 16, which lies in a cylinder or chamber 17, the edges of the diaphragm being tightly clamped between a flange or collar 18 on the cylinder and a flat ring 19 lying thereon. The body of the diaphragm is distended by the weight of the plunger and lies in a cup-shaped position in the cylinder 17, a similarly-formed piece of metal or other material 20 being placed thereon to keep the diaphragm from buckling. The cylinder 17 is filled to a suitable point with some colored fluid which is susceptible of a small contraction and expansion only, and a vertical graduated tube 21 is connected at its lower end to said cylinder, whereby any downward and upward movement of the plunger will cause a corresponding rise and fall of the fluid in the tube 21.

At a suitable point upon the face of the metallic plate 2 are mounted brackets 22, upon which a resistance-drum 23 is supported, said drum being composed, preferably, of a core of wood or hard rubber having a peripheral spiral channel in which is wound a wire 23ᵃ. One side of the core of this drum is flattened or cut away slightly to cause the coils of the wire to project as they cross the flattened portion which is formed upon the upper part of the horizontally-placed core. Upon this flattened wire-traversed face rests a wheel 24, formed of conducting metal, to which is attached the end of an arm 25, of similar material, the other end of which is pivotally attached to one of the collars 6ᵃ or to some other part of the bar 6. The movement of this bar under the alternate attraction of the cores will cause this wheel to roll in one direction or the other upon the resistance-drum, and it will be seen that when moved in one direction or the other more or less of the coils of said drum will be inserted in or cut out of any circuit of which the wire of the drum and the bar of the solenoids form a part. The coils or spirals of the drum or rheostat 23 are insulated by isolation in the spiral channel of said drum or core.

Mounted upon the base-plate 1 is a switch apparatus having the following construction: Supported upon any suitable or preferred form of bracket are two solenoids 26 26ᵃ, their cores lying in the same straight line and separated from each other by a short interval. Within these cores lies a soft-iron bar or rod 27, which is centrally supported and balanced upon a pivot 28, formed of conducting metal, mounted in an upper and lower support 29 and lying centrally in the space or interval between the solenoids. The ends of the bar or rod 27 project beyond the outer ends of the cores and lie between the poles of two horseshoe-magnets 30 and 31—one at one end of the rod and the other at the other end—leaving the soft-iron bar 27 free to swing or vibrate in the cores of the solenoids as far in either direction as is permitted by the poles of the horseshoe-magnets. The horseshoe-magnets are attached and arranged in such manner that the north poles are on one side and opposite one to the other and the south pole similarly arranged upon the opposite side. The solenoids are formed of suitable layers of insulated wire wound upon brass cores in the usual manner. With the addition of the circuits these parts comprise the whole of the apparatus, except the heat-indicators or thermometers, which I will first proceed to describe, and will then trace the electric circuits.

I may or may not employ a heat-indicator having a mercurial column; but inasmuch as this class of thermometer is applicable to a large variety of uses in connection with this invention I have shown one form of the same adapted to my invention. This thermometer consists of an iron cup 32, within the open end of which is screwed an ebonite cap 33, having a central opening 34. Upon this base are mounted a series of conducting-disks 35, insulated from each other by interposed disks 36, of paper, rubber, glass, or other non-conducting material, the whole forming a column having a central bore 37, coinciding with the central opening of the cap 33, for the rise and fall of the mercurial column. The disks are held in position by rods 38, and upon opposite sides of the metallic disks are formed short arms 39, which extend in opposite directions, those arms from one side of the column to the arms of the other side being connected by a wire, which forms a series of resistance-coils 40 between the first arm on one side and the arm of the second disk upon the other side of the column. In the same manner the second disk is connected to the third, and so on throughout, the coils between the successive arms being of equal resistance. One end of the wire forming these coils is carried down through the ebonite cap 33 and is in permanent contact with the mercury with which the cup is 32 filled. After reaching the disk 35 at the top of the column it is connected to a binding-post 41, insulated in a cap 42. Upon one of the metal rods 38 is mounted a binding-post 43, which is in electrical contact with the mercury of the cup 32 by way of the metal rod and iron cup. Through the insulated binding-post 41 is passed an ebonite core 44, in which lies a threaded needle 45, graduated in such manner as to guide the operator in adjusting it up or down, whereby its point is raised and lowered in the mercury-channel of the thermometer, in the manner and for the purposes hereinafter described. The body of the thermometer may be inclosed by a cylindrical shell of any suitable material.

The electrical circuits are as follows: The numeral 46 denotes a battery of any preferred type and consisting of one, two, or more cells, as circumstances may require. From one pole of this battery is led a wire 47, of a length determined by the number and distance of the several points where the heat-indicators are located, both of said factors being practically unlimited. For the purpose of illustration, let it be supposed that there are four of these heat-indicators upon this line, each one being designated by the letter T, and all of similar construction, the number of resistances 40 in each indicator being equal to the number of coils in the resistance-drum or rheostat 23, and each one of the coils 40 being equal in resistance to one of the coils or spirals of the wire $23^a$.

Each thermometer or heat-indicator T is connected by way of the binding-post 43 with the wire 47, and at each instrument this wire, which for convenience may be termed the "indicator-circuit," is divided into two branches, one branch leaving the thermometer by way of the binding-post 41 and being simply a continuation of the wire 47, which is carried into the solenoid 26, and thence by wire $47^a$ back to the battery. The other branch of the indicator circuit consists of the wire 48, of exactly equal resistance to the branch 47. This wire, which branches or divides at the point 49, is conducted to and through the resistance-drum or rheostat 23, and is brought at the end of the core of the said rheostat up to the point where it may make electrical contact with the wheel 24. The divided circuit is normally open at the point 49 corresponding to each instrument T, and a button 50 is provided whereby it may be closed. When the circuit is closed through any one of the instruments T by pushing down this button, the current will pass through said wire to the rheostat 23, thence through wheel 24, arm 25, collar $6^a$, soft-iron bar 6, wheel 7, brass plate 3, to a binding-post 51, thence by wire 48 into the solenoid $26^a$, and then by way of wire $48^a$ and $47^a$ back to the battery. These solenoids 26 and $26^a$ are wound in opposite directions, for a purpose fully described hereinafter. Now, it will be seen that with the mercury standing at any given point in the instrument through which the circuit has been closed a certain number of the resistances 40 will have been cut out of the one branch of the indicator-circuit, and the current will therefore traverse that branch offering the least resistance, and as a result the solenoid 26 will be magnetized, or, on the other hand, the current will traverse the other branch and magnetize the solenoid $26^a$. The soft-iron bar 27 will thereby become polarized, and its polarity is changed by the opposite direction of the current in one solenoid as compared with that in the other, and it is thus deflected to one side or the other, according to which branch of the indicator-circuit is traversed by the current, and at its end makes contact with one or the other of two platinum contacts 52 or $52^a$, mounted upon the poles of the horseshoe-magnet 30. To one of these contacts, as 52, a wire 53 is connected, leading to and through the solenoid 5 and thence to one pole of the battery, while from the other contact $52^a$ a wire 54 leads to and through the other solenoid $5^a$ and thence to the same pole of the battery. This circuit, which may be termed, for convenience, the "measuring-circuit," is completed by a wire 55, leading from the other pole of the battery to the pivot 28, carrying the bar or needle 27. As the solenoid 5, for example, is magnetized, it exerts its force upon the soft-iron bar 6, drawing it longitudinally until the collar $6^a$ is brought into contact with the core of the solenoid. This movement causes the wheel 24 to move upon the rheostat 23 from the point where it rests upon the wire 48, and by its movement coil after coil of the wire $23^a$ of the rheostat is inserted in this branch of the circuit until the resistance of the two branches is exactly the same. Should it happen, however, that the momentum of the soft-iron bar 6 carries it too far and inserts too many of the coils of the rheostat, the circuit will instantly be diverted to the other branch of the indicator-circuit, the other solenoid of the switch apparatus will become magnetized, the polarity of the bar or needle 27 will be changed, and it will be deflected to the other side, cutting out the solenoid 5 of the measuring-circuit and switching in the solenoid $5^a$. By this action the bar 6 will be retracted until an exact balance is reached The movement of the bar 6 produces rotation of the pinion 9, meshing with its rack 8, and this movement is communicated to the pinion 12 and thence to the plunger 14, whereby the diaphragm 16 is caused to contract or expand the dimensions of the cylinder-chamber 17, the fluid in which is pumped or forced into or out of the graduated tube 21, by which the thermal indication of the instrument T is accurately shown.

It is understood that each switch, key, or button 50 is numbered, lettered, or otherwise distinguished as corresponding to one instrument in the circuit, having a designated location. These keys are arranged in a central or main station, or at such point as may be desired—as, for example, in the cabin of a vessel—while the heat-indicators are placed at various points in the hold or holds and between decks. In proportion to the distance of the several instruments resistances 56 are inserted in the one branch of the indicator-circuit to equalize the resistance of the other branch.

A wire 57 is connected to the top of the needle 45 of each thermometer and leads thence directly to a call-bell or other alarm apparatus 58. These needles may be adjusted independently in each instrument T to any desired point, and when the mercury column rises high enough to make contact with their point the circuit will be closed through the alarm and a call be sounded on the latter, which will continue until the circuit is opened by lowering of the temperature or by the interposition of the operator, who tests all the instruments to ascertain the point of danger.

The rheostat 23 may be constructed substantially like the resistance-coils of the thermometer, and in each the several resistances may be made to correspond with one degree of temperature.

This constitutes my automatic apparatus; but inasmuch as the measurement of very delicate variations of temperature cannot well be effected in conjunction with an automatic switch I may dispense with the latter under certain circumstances, as well as with the measuring-circuit, and substitute therefor the devices shown in Fig. 4. In this figure the numeral 59 denotes a differential galvanometer of any preferred construction, and the numeral 60 denotes a rheostat substantially similar in construction to the rheostat 23, already described. Upon this rheostat rests a contact-wheel 61, carried by a threaded sleeve or nut 62, traveling upon a threaded rod or bar 63, journaled in posts 64, and having a crank 65, by which it may be rotated in either direction. Upon the nut or sleeve 62 is a finger or index 66, which moves over a graduated scale 67, upon which are indicated a number of degrees corresponding to the thermal scale in the thermometers. The branch of the indicator-circuit 47 passing through instruments T is connected to the coils of the differential galvanometer 59 and to the battery, and the other branch of said circuit 48 is connected to the rheostat 60 in the manner already described in connection with the rheostat 23, and is thence taken by way of the binding-post 68 to the other reverse coil of the galvanometer 59, both branches being of equal resistance in themselves. The rod or bar 63, carrying the contact-wheel 61, being in electrical contact with the binding-post 68, and the thermometers T being all placed and connected in the manner set forth already, if the key 50 is closed and the circuit made through any one of said instruments the needle of the galvanometer will be deflected if the resistance in the two branches of the indicator is unequal. If, now, the screw-rod 63 is operated to cause the wheel 61 to traverse the rheostat, the resistance of the two branches will at a certain point in such movement become equalized, and the galvanometer-needle will gradually move back toward zero as the contact-wheel traverses the rheostat until at the moment of reaching the zero-point, when the operator ceases moving the rod 63. The index will then stand at a point on the scale indicating the degree or fraction of a degree of temperature existing in the immediate vicinity of the instrument through which the circuit has been closed.

For exceedingly delicate variations I may use a thermometer or heat-indicator consisting of a series of carbon rods 69, placed side by side against a base-plate and cap-plate 70 and 71, confined together by an insulated rod 72 of metal. By the contraction and expansion of the latter the carbon will be more or less compressed and its resistance correspondingly increased or diminished.

What I claim is—

1. In an apparatus for ascertaining the temperature at one or more distant points, the combination, with a battery-terminal splitting into a branching circuit, of one or more thermometers arranged in the one branch and adapted to increase or decrease the resistance upon changes in temperature, a variable and measurable resistance in the other branch, and automatic means for varying said resistance to equalize the resistance in the two branches, substantially as described.

2. In an apparatus for ascertaining the temperature at one or more distant points, the combination, with a battery-terminal splitting into a branching circuit, of one or more thermometers arranged in the one branch and adapted to increase or decrease the resistance upon changes in temperature, a variable and measurable resistance in the other branch, and automatic mechanism for varying and simultaneously measuring the variation of resistance required to equalize the resistance in both branches, substantially as described.

3. In an apparatus for ascertaining the temperature at one or more distant points, the combination, with a battery-terminal splitting into a branching circuit, of one or more thermometers arranged in the one branch and adapted to increase or diminish the resistance in said branch upon changes in temperature, a series of equal and measurable resistances arranged in the other branch of the circuit, a contact movable upon said resistances to insert and cut out the same, means for moving said contact in two directions, and an automatic circuit-closer oppositely polarized by the direction of the battery-current to close the circuit actuating the movable contact in either direction, substantially as described.

4. In an apparatus for ascertaining the temperature at one or more distant points, the combination, with a battery-terminal splitting into a branching circuit, of one or more thermometers arranged in the one branch and adapted to increase or diminish the resistance in said branch upon variations in the temperature, a series of equal and measurable resistances arranged in the other branch of the circuit, a movable contact resting on said resistances, a bar carrying said contact and moved in two directions by opposite solenoids, an automatic circuit-closer consisting of a bar which is oppositely polarized by battery-currents of opposite direction to make and break the circuits of the respective solenoids, and a measuring-instrument operated by the bar carrying the movable contact, substantially as described.

5. In an apparatus for measuring and ascertaining the temperature at a series of distant points, the combination, with a series of heat-indicating instruments having resistances varying with the thermal variations, of a circuit for said instruments, divided into two branches of equal resistance, an automatic switch operated in either of two directions by one or the other of said branches, a series of resistances automatically introduced into one branch of said circuit to equalize the resistance of the other branch, a movable contact operated in two directions by the currents alternately traversing said branches, and a measuring device automatically actuated by the device carrying the movable contact to measure the variations in resistance upon a scale showing the thermal changes, substantially as described.

6. In an apparatus for measuring and ascertaining the temperature at one or more distant points, the combination, with one or more heat-indicating instruments located at said points, of a circuit for said instruments, divided into two equal branches, the resistance of one of said branches being varied by the rise and fall of the mercurial column in the instrument, a switch having a bar oppositely polarized by the current traversing the respective branches, and an equalizing and measuring apparatus switched in by said bar and acting in either one of two opposite directions, substantially as described.

7. In an apparatus for ascertaining the temperature at one or more distant points, the combination, with a heat-indicator having a series of resistances cut out and inserted by the rise and fall of the mercurial column, of a circuit for said indicator, divided into two branches of equal resistance, a switch apparatus consisting of two solenoids with a centrally-pivoted bar lying therein and two horseshoe-magnets with their poles lying in opposition at the ends of the solenoids, a measuring-circuit having its wires attached to contacts on the opposite poles of one of said magnets and to the point of the bar pivoted in said solenoids, a pair of independent solenoids included in said measuring-circuit, a bar actuated in two directions by said solenoids, a contact-wheel actuated by said bar, a rheostat containing a series of similar resistances inserted in or cut out from one branch of the indicator-circuit by the movement of the bar, a graduated tube communicating with a pump-cylinder, and a plunger actuated by said bar to force fluid into or withdraw it from said tubes, substantially as described.

8. In an apparatus for ascertaining the temperatures at one or more distant points, the combination, with a battery-terminal splitting into a branching circuit, of one or more thermometers arranged in the one branch and having each a series of resistances which are cut in or out of said branch by the fall and rise of the mercurial column, a variable and measurable resistance in the other branch of said circuit, consisting of a series of resistances whereof each individual member is equal to each resistance in each of the separate thermometers, means for inserting and withdrawing one or more of said series from the branch in which said series is arranged, and a scale upon which such withdrawal and insertion are measured, substantially as described.

In testimony whereof I have affixed my signature in presence of two witnesses.

F. W. WIESEBROCK.

Witnesses:
JAMES L. NORRIS,
JAMES A. RUTHERFORD.